(No Model.)

J. L. REED.
COMBINED GRAIN DRILL AND CORN PLANTER.

No. 281,558. Patented July 17, 1883.

Witnesses:
J. Henry Kaiser.
Jacob Felbel.

Inventor:
John L. Reed,
by atty. J. N. McIntire.

UNITED STATES PATENT OFFICE.

JOHN L. REED, OF CANAJOHARIE, NEW YORK.

COMBINED GRAIN-DRILL AND CORN-PLANTER.

SPECIFICATION forming part of Letters Patent No. 281,558, dated July 17, 1883.

Application filed April 5, 1883. (No model.)

*To all whom it may concern:*

Be it known that I, JOHN L. REED, of Canajoharie, in the county of Montgomery and State of New York, have invented a new and useful Combined Grain-Drill and Corn-Planter; and I do hereby declare that the following is a full, clear, and exact description thereof, reference being had to the accompanying drawings, making part of this specification.
My invention has for its object to provide for use a machine which shall be capable of serving both the purposes of a grain-drill for sowing grain continuously in furrows and of a corn-planter for sowing corn, &c., at periodical points in the furrows, or, in other words, in hills.

Previous to my invention, so far as I know, although machines have been made which were capable of performing these different kinds of work in the field, they were necessarily complicated and expensive, on account of the employment of two or more hoppers for containing the materials which were to be sown in different manners, and the use of two or more separate sets of devices for effecting the proper discharge of the seed to be sown in one or another way. I propose by my invention to provide for use a machine which shall be exceedingly simple of construction, economical of manufacture, and in the use of which, by a mere adjustment of certain parts or attachments, the machine may be set so as to perfectly operate in sowing the seed from a single hopper or supply-reservoir, and through some one or more of the same set of guiding and discharging devices, either continuously in furrows or periodically at given points in the furrows; and to this main end and object my invention consists, essentially, in a combined grain-drill and corn-planter, such as will be hereinafter more fully explained, and such as will be more particularly defined in the claims of this specification.

To enable those skilled in the art to which my invention relates to understand and practice the same, I will now proceed to more fully describe my improvements, referring by letters to the accompanying drawings, which form part of this specification, and in which I have illustrated a combined grain-drill and corn-planter embracing my invention in the form best known to me now, and in which I contemplate carrying out my invention, although it may be practiced, of course, in other forms of machines.

Figure 1:
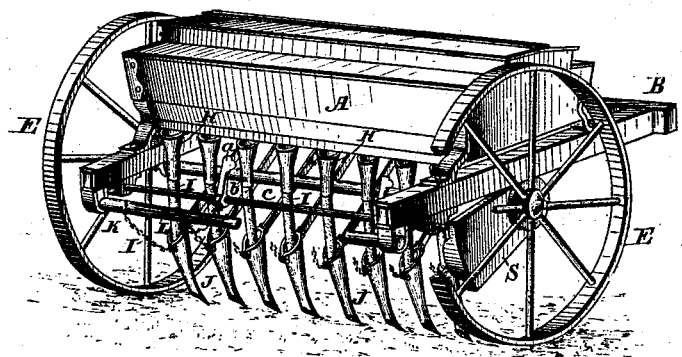
Figure 2:
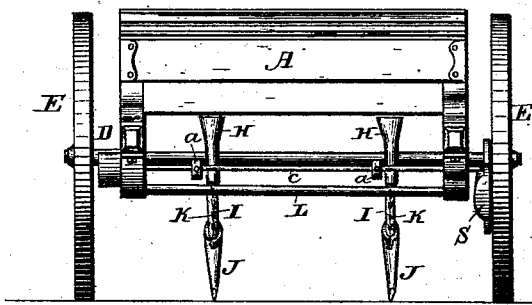
Figures 3, 4:
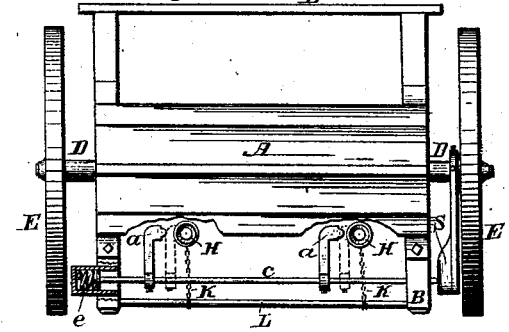

In the said drawings, which constitute part of this specification, Figure 1 is a perspective view of a combined grain-drill and corn-planter such as I have devised, and with the parts set or adjusted to adapt the machine for use in sowing grain continuously in furrows in about the usual manner. Fig. 2 is a back view of the same, showing the machine with a portion of the furrow-forming devices removed and the other devices set or adjusted so as to adapt the machine to the purposes of sowing corn, &c., at proper distances apart in a less number of furrows, in order that the corn or other grain may be cultivated in hills, in the usual and desirable manner. Fig. 3 is a partial top view for the purpose of showing more particularly the valvular or cut-off contrivance by which the machine is rendered capable of discharging material from the hopper into the drill-spouts periodically instead of continuously. Fig. 4 is a detail view, showing more particularly the devices or means by which the cut-off mechanism is properly operated periodically and held out of operation when the machine is to be used for sowing grain continuously in the furrows.

In the several figures the same part will be found designated by the same letter of reference.

A represents the usual hopper-like device or receptacle for carrying the grain to be planted, and on which the driver of the vehicle usually rides, while B represents the usual supporting frame-work; D, the axle, and E E the wheels, all substantially like the similar parts of an ordinary approved form of grain-drill.

H are the chute-like devices into which the grain or other material contained in the hopper or receptacle is fed by any of the usual appliances for that purpose, while I are the ordinary flexible tubes which convey the grain or other material discharged from said chute-like devices down into the hoes or furrow-forming tubular devices J, which latter, as usual, are suspended by flexible connections K from a lifting-beam, L, by means of which they may be raised up when it is not desired to form furrows in the ground in the usual manner.

As is well understood, in sowing or planting corn or other grain to be cultivated in separate hills, in contradistinction to drilling in grain continuously in furrows, the planting is done farther apart in the direction of the length of the row of tubular devices or drills J; and hence when a grain-drill is employed for planting corn in continuous rows some of these devices are removed from the machine, and the feeding or flow of the material from the hopper or the receptacle to the chute-like devices, which would conduct it to the tubes, which have been removed, is stopped or prevented. Now, in the use of my improved or combined machine I propose to utilize a portion of the chute-like devices, flexible tubes, and drilling tubes or devices for the purpose of planting the corn in hills, instead of planting it in continuous rows, as ordinary grain-drills have heretofore been used for planting, by removal of a portion of the grain-feeding devices, as just mentioned. To do this I simply provide such ones of the chute-like devices as it may be necessary to employ in corn-planting with means by which the discharge of the grain continuously fed into such chute-like devices may be rendered periodical, so as to deposit the contents of said chute-like devices at given points in the furrows formed by the drill-like devices, with which said chute-like devices are connected by the flexible tubular conveyers, and provide means for automatically operating the devices by which the chute-like devices H are rendered capable of performing the functions of collecting, in proper quantity, the grain continuously fed into them by the feeder of the grain-hopper, and discharging their entire contents periodically, so as to sow the corn in hills or at given distances apart in the continuous furrows formed by the machine. The means which I have herein shown for accomplishing this purpose consist, as seen, simply of a series of valvular slides or cut-offs, $a$, which are adapted to enter thin slots $b$, formed in a portion of the shell of the tubular chute-like devices H, and connected adjustably with a rod, $c$, adapted to be moved endwise in suitable bearings by means of a cam-like device, (attached to one of the wheels of the machine), which moves said rod in one direction, and a spring, $e$, which moves said rod in the opposite direction.

Now, the operation of the combined grain-drill and corn-planter, it will be understood, is about as follows: When the machine is to be used for drilling in grain continuously, the sliding rod $c$, with its valvular attachments, is simply turned over into the position seen in dotted lines at Fig. 3, which puts it in a condition of disuse, and the machine with its full complement of tubes works in the ordinary manner of a grain-drill. When, however, it is desired to plant corn, a sufficient number of the drills are removed, so as to form furrows which shall be a distance apart equal to the desired distance between the hills of corn. The spring-rod device is turned over into its working position, so that the valvular slides $a$ will play in and out in the slots $b$ of the chute-like devices H, and the usual means are applied to the seed-hopper and its internal feeding mechanism to confine the feeding of seed to those chute-like devices H which are now designed to be employed, when, by the usual progress of the machine, the seed-drills, which have been left attached or remain in a working position, form the usual continuous furrows at the proper distance apart, and the corn which is continuously fed into the chute-like devices, which are located over said drilling devices, is received and collects therein during the time that the valvular slides remain in their slots in said chute-like devices, and is periodically discharged therefrom every time the said valvular devices are withdrawn from said slots by the action of the cam-like devices S on the sliding rod $c$, in the manner as shown and heretofore explained.

From the foregoing description, in connection with the drawings, it will be seen that by simply combining with the ordinary grain-drill some such appliances as I have referred to, and by some such suitable adaptation of some of the chute-like devices to said appliances as I have explained, I am able to produce for the use of the farmer a machine which, by the simple adjustment of its parts, is rendered capable of not only sowing or drilling in grain and fertilizers in the usual manner and of sowing corn (if it be desired) in continuous rows, but in furrows farther apart than those necessary for drilling in other kinds of grain, but also capable of sowing corn or other seed in hills or at equidistant points in parallel lines; and it will be seen that a combined machine such as shown and described, while it will perfectly serve all the purposes of both a grain-drill and a corn-planter, will cost only a trifle more than one of such two machines, and will occupy, of course, only the storage-room of one machine, instead of two, and that, therefore, on the score of economy and convenience to the farmer, my invention is of exceedingly great advantage.

Of course, in carrying out my invention machines of various forms and constructions, both as to the devices necessary for sowing seed in rows and as to those necessary for sowing seed in hills, may be employed, and I therefore wish it to be understood that I do not consider my invention as necessarily restricted to a use of the herein-described attachments or devices for causing the seed to be discharged periodically to any precise form of seed supplying and furrowing devices, nor to the precise form of valvular devices used in connection with the tubes or chutes arranged beneath the hopper, but that, Having now so fully explained the gist of my invention and that mode of carrying out the same which is the best now known to me that those skilled in the art can make and use my invention, what I claim as my invention, and desire to secure by Letters Patent, is—

In a combined seed-drill and corn-planter, the combination, with the usual hopper or feed-box and the usual chute-like devices, H, into which grain or other material contained in the hopper is fed for the purpose of supplying the usual hollow plows or tubular seed-drills, of slide-like or other valvular devices *a*, adapted to work in slots or openings formed in such ones of the series of devices H as may be necessary for use in sowing corn or other seed in hills, the said slides or valvular devices, which co-operate with the slotted chute-like devices H, being adapted to be set or thrown in and out of working position, substantially in the manner and for the purposes hereinbefore described.

In testimony whereof I have hereunto set my hand and seal this 19th day of March, 1883.

JOHN L. REED. [L. S.]

In presence of—
 ELI H. COOK,
 CHAS. T. STAFFORD.